US006856405B2

United States Patent
Tang

(10) Patent No.: US 6,856,405 B2
(45) Date of Patent: Feb. 15, 2005

(54) NON LINEAR PHASE SHIFT CALIBRATION FOR INTERFEROMETRIC MEASUREMENT OF MULTIPLE SURFACES

(75) Inventor: Shouhong Tang, Tucson, AZ (US)

(73) Assignee: Phase Shift Technology, Inc., Tucson, AZ (US)

( * ) Notice: Subject to any disclaimer, the term of this patent is extended or adjusted under 35 U.S.C. 154(b) by 157 days.

(21) Appl. No.: 10/379,228

(22) Filed: Mar. 3, 2003

(65) Prior Publication Data

US 2004/0174526 A1 Sep. 9, 2004

(51) Int. Cl.$^7$ ................................................. G01B 9/02
(52) U.S. Cl. ..................................... 356/512; 356/515
(58) Field of Search ................................ 356/450, 489, 356/495, 511, 512, 513, 514, 515

(56) References Cited

U.S. PATENT DOCUMENTS

| | | | | | |
|---|---|---|---|---|---|
| 4,594,003 | A | * | 6/1986 | Sommargren | 356/489 |
| 5,473,434 | A | * | 12/1995 | de Groot | 356/514 |
| 5,488,477 | A | * | 1/1996 | de Groot | 356/514 |
| 6,359,692 | B1 | * | 3/2002 | Groot | 356/512 |
| 6,717,680 | B1 | * | 4/2004 | Kuchel et al. | 356/514 |
| 6,744,522 | B2 | * | 6/2004 | De Groot et al. | 356/503 |
| 6,788,422 | B2 | * | 9/2004 | Deck | 356/512 |
| 2004/0105097 | A1 | * | 6/2004 | Tang | 356/514 |

OTHER PUBLICATIONS

B Bruning J.H., Herriott D.R., Gallagher J. E. Rosenfeld D.P., Ehite A.D., and Bran Brangaccio D.J., "Digital wavefront measuring interferometer for testing optical surfaces and lenses", Appl. Opt. 13, 2693–2703(1974).

C.L. Koliopoulos, "Interferometric optical phase measurement techniques," Ph.D. Fissertation, Optical Sciences Center, Univ. Of Arizona(1981).

K. Kinnstaetter, A. W. Lohmann, J. Schwider, and N. Streibl, "Accuracy of phase shifting interferometry," Appl. Opt. 27, 5082–5089(1988).

P. de Groot, "Measurement of transparent plates with wavelength–tuned phase–shifting interferometry," App. Optics, vol. 39, No. 16,2658–2663(2000).

K. Okada, H. Sakuta, T. Ose, and J. Tsujiuchi, "Separate measurements of surface shapes and refractive index inhomogeneity of an optical element using tunable–source phase shifting interferometry," App. Optics, vol. 29, No. 22, 3280–3285(1990).

K. Freischlad and C.L. Koliopoulos, "Fourier description of digital phase–measuring interferometry," J. Opt. Soc. Am. A7, 542–551(1990).

S. Tang, "Generalized algorithm for phase shifting interferometry", SPIE, Denver, Jul. 1996.

G. Lai and T. Yatagai, "Generalized phase–shifting interferometry," J. Opt. Soc. Am. A8, 822–827(1991).

* cited by examiner

Primary Examiner—Gregory J. Toatley, Jr.
Assistant Examiner—Patrick Connolly
(74) Attorney, Agent, or Firm—LaValle D. Ptak

(57) ABSTRACT

A method and apparatus to linearize the phase shifts produced by the wavelength-varying driving mechanism of an interferometer used in phase shift interferometry for the measurement of multiple reflective surfaces first calibrates a sequence of physical values used as the input to the driving mechanism to produce a known linear or a known constant phase shift increment between any two adjacent interferograms. The calibration process, in essence, involves the determination of the sequence of physical values, such as the voltage change with respect to the time, through the process of iteration. This sequence then is used as an input to the phase shift driving mechanism for ongoing operation of the system, thereby compensating for non-linear characteristics of the system.

7 Claims, 3 Drawing Sheets

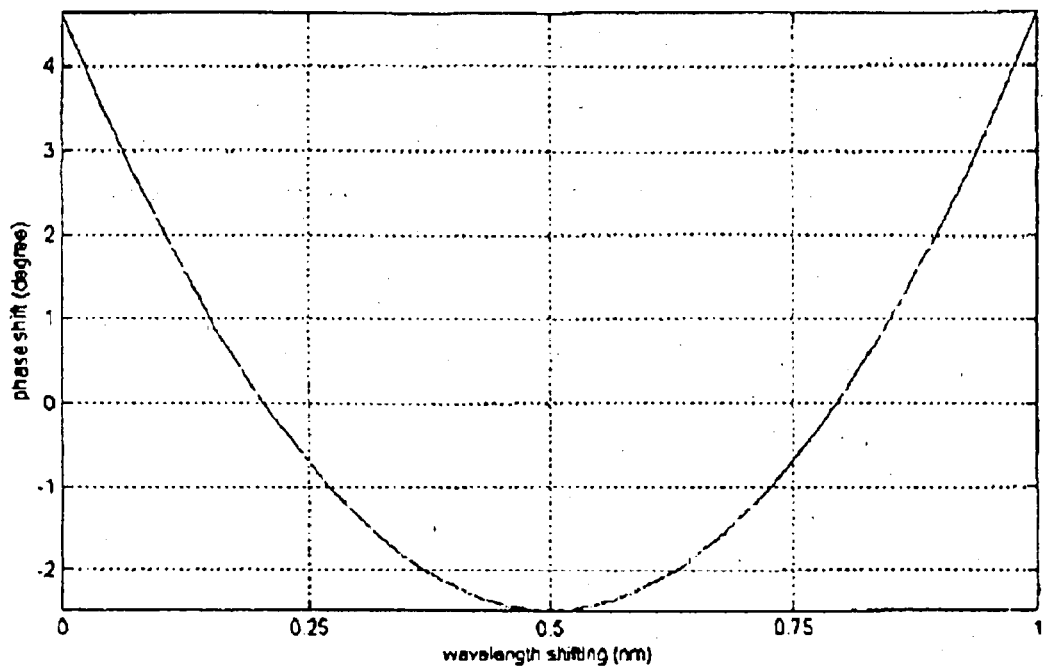
FIG 2. Nonlinear phase shift due to wavelength shifting
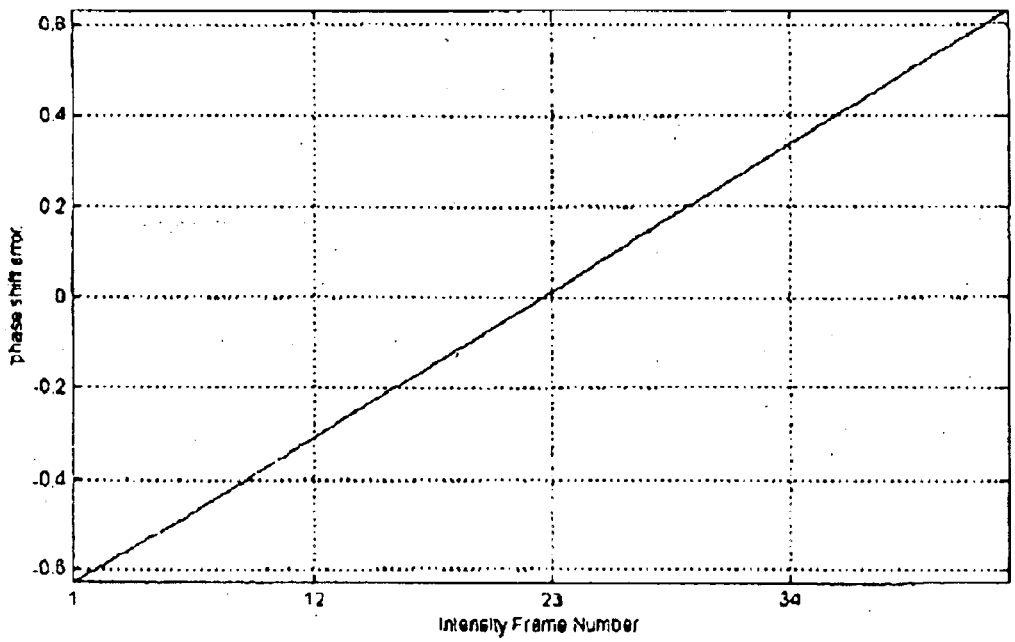
FIG 3. Phase shift error between adjacent interferograms

NON LINEAR PHASE SHIFT CALIBRATION FOR INTERFEROMETRIC MEASUREMENT OF MULTIPLE SURFACES

BACKGROUND

This invention pertains to the field of interferometric profilometry or, more precisely, to the field of wavelength tuned phase-shifting interferometry. Specifically, the invention is directed to a system and method utilizing a tunable coherent light source for the simultaneous measurement of multiple reflective surfaces to obtain precise surface height (or phase) information from a set of phase-shifted superimposed interferograms.

Phase-shifting interferometry (PSI) has proven to be a highly accurate and efficient method for the measurement of reflective surfaces in a variety of applications including optical testing, surface profilometry, surface roughness estimation and surface displacement measurement. The fundamental concept of PSI is that the phase of an interferogram can be extracted accurately by acquiring a set of phase shifted interferograms (or intensity frames) with a constant phase shift between any two adjacent frames. The phase shifts can be produced either by changing the optical path difference (OPD) between the test and a reference surface, or by changing the measurement wavelength if the OPD is not zero or by changing the polarization of light. Thus, all types of PSI measurements rely on some mechanism to shift or change the phase of an interferogram in a regular and predictable manner.

Phase shift interferometers have been successfully used for many years for achieving surface topography measurements of single surfaces. One such system is disclosed in the U.S. Pat. No. 5,473,434 to DeGroot. In the system of this patent, the phase shifts are produced by an assembly which mechanically, physically displaces components of an interferometer to vary the length of the cavity.

The U.S. Pat. No. 4,594,003 to Sommargren also is directed to an interferometer method and system to provide a phase map representing the optical path differences between a reference surface and a single object surface. In the system disclosed in the Sommargren patent, the phase differences are produced by utilizing a diode laser light source, the wavelength of which is varied; so that the phase difference between the two wave fronts producing the interference pattern is modulated by a known amount. The modulated interference pattern then is sensed with an imaging device; and the signals are processed to provide the desired phase map.

The systems of the U.S. Pat. Nos. 4,594,003 and 5,473,434 described above are representative of systems which are capable of providing phase measurements where there is only one surface involved. Although constant phase shifts are required by PSI to measure a single reflective surface, the phase calculation errors for a single surface are relatively small or insignificant; so that these small errors may be ignored, in most applications. The reason for this is that only a few interferograms are needed to extract phases from a single interferogram. Algorithms for single surface PSI, using five frames or seven frames of interferograms with a 90° phase shift between adjacent frames, are most commonly used. The relatively small number of frames employed is such that even if non-linear shifts between adjacent frames exist, the errors produced are insignificant. For this reason, single surface interferometric methods and systems typically shift the wavelength of a laser light source (the coherent light source) by applying voltage increments of equal amounts, even though the actual phase shifts produced are not linear, that is, the frequency shift between any two adjacent intensity frames is not the same.

Recently, PSI has been applied to the measurement of parallel plane transparent objects with multiple reflective surfaces. Such objects include thin glass plates, thin silicon wafers, and the like. These new applications produce multiple interferograms superimposed on the recording plane (or detector) of the system. Consequently, PSI for parallel plane objects cannot employ production of the desired phase shifts by varying the OPD directly. The reason a simple variation of the OPD is insufficient is that the phase shift speeds (or signal frequencies) are the same for each superimposed interferogram; and it is unlikely that any phase algorithm can be devised to separate the individual signals and then assign them to their respective surfaces. As a result, phase shifts for parallel plane multiple reflective surfaces require the use of a wavelength shifting driving mechanism to take advantage of the fact that the phases of each of the interferograms in the superimposed interferograms shift at different speeds (or signal frequencies) during the acquisition.

New algorithms have been developed for such multiple surface applications to extract the phases of all individual interferograms from a set of intensity frames. These new algorithms require the acquisition of many more intensity frames (as compared to single surface measurements), and with more precise phase shifts, in order to separate every individual interferogram from superimposed signals of other interferograms.

A system for accomplishing the measurement of the front and back surface topography of transparent objects which have substantially parallel surfaces is disclosed in the U.S. Pat. No. 5,488,477 to DeGroot. A relatively complex mathematical determination is employed in this patent to separate interference contributions due to the multiple reflections of the two parallel surfaces of the object. Among the procedures which are required by this patent is the reversing of the orientation of the object between two successive interference measurements. This then is followed by mathematical calculations to provide the desired profiles of the two different surfaces. A significant disadvantage of the system and method disclosed in this patent is the requirement of the reversing of the orientation of the object between measurements. This physical removal and replacement of the object after it is reversed is, in and of itself, capable of introducing errors into the final results.

The U.S. Pat. No. 6,359,692 to DeGroot is directed to another method and system for profiling objects having multiple reflective surfaces. In the system and method of this patent, a phase-shifting algorithm using a Fourier transform, operating in conjunction with a Fizeau interferometer is designed to extract the phases of a selected one of the multiple interference patterns produced by the different surfaces of the object. The algorithm is designed to select the patterns for only one of the surfaces. The algorithm then must be changed in order to select corresponding patterns for the other of the surfaces, while rejecting the patterns for the first surface.

It should be noted that to measure objects with multiple reflective surfaces such as a transparent plate, the underlying algorithm which is used must have the ability to extract phases of an underlying interferogram from a set of intensity frames with superimposed interferograms. To accomplish this, in general, a large number of intensity frames are needed, especially in the case of measuring thin transparent plates (for example, having a thickness less than 1 mm). If a measuring system cannot produce enough intensity frames, the algorithm may lose its ability to separate an interferogram of interest from a set of superimposed interferograms.

A different algorithm, using least-square fitting techniques to separate the front surface, back surface and thickness of a plate in PSI, was reported by Okada et al. in 1990 in a paper in *Applied Optics*, Vol. 29, No. 22, 1 August 1990, pp. 3280 to 3285. The RMS errors of the measurement for the surface shape are l/50 wavelengths in his paper. This measurement accuracy, however, is very difficult to achieve. One reason is the positioning of both the calibration object and the measurement object must be done with high precision. Even though there is a theoretical accuracy to this level, such measurement accuracy has not been achieved in industrial applications. In addition, the high precision positioning requirements for accomplishing the types of results theoretically set forth in the Okada paper preclude the use of the Okada system and method in a production line operation.

The non-linear phase shift errors which have been tolerated with single surface PSI methods and systems cannot be tolerated in systems for measuring parallel plane transparent objects, as described above in the Okada article and the DeGroot U.S. Pat. Nos. 5,488,477 and 6,359,692. The reason such non-linear phase shift errors cannot be tolerated in the measurement of transparent objects with multiple reflective surfaces is that the phase shift speed for each underlying interferogram varies (or the signal frequency spreads), and it is unlikely that a phase algorithm can be devised to separate the individual signals and then assign them to their respective surfaces. For applications to efficiently and accurately measure multiple parallel surfaces of transparent objects, it is necessary to use a wavelength shifting driving mechanism which takes advantage of the fact that the phases of each of the interferograms in the set of superimposed interferograms shift at different speeds (or signal frequencies) during the acquisition. Algorithms for extracting the phases of all of the individual interferograms for a set of intensity frames require the acquisition of many more intensity frames (40 to 80, for example) as compared to single surface measurements (which typically use 5 to 7 intensity frames for acquisition), and with more precise phase shifts in order to separate every individual interferogram from superimposed signals. For the measurement of a transparent plate having an 800 μm thickness for example, in a practical system setup, at least eighty frames of superimposed interferograms are required to separate the individual interferograms. The phase shift errors result in ambiguities in the separation of the individual interferograms from the combined signals. The separating errors, in turn, result in large phase errors on each surface as the information from the various surfaces is now mixed in a complicated manner. As mentioned above, this problem is not encountered in the phase measurement of a single surface.

As an example, the phase shift from an interferometer with a wavelength tunable laser can be expressed as $$\theta(t) = \frac{2\pi L(x, y)\Delta\lambda(t)}{\lambda(\lambda - \Delta\lambda(t))}. \quad (1)$$

where L is the optical path difference of the test surface and the reference mirror, $\lambda$ is the initial measurement wavelength, and $\Delta\lambda(t)$ is the wavelength change. The relationship between the phase shift $\theta(t)$ and the wavelength shift $\Delta\lambda(t)$ is not linear. This is clearly shown in Equation (1). This implies that the phase shift between any two adjacent intensity frames is not a constant if the wavelength change is directly proportional to the time. Such phase shift variation is small when $\Delta\lambda(t)<<\lambda<<L$. For the measurement of a single reflective surface, only very small $\Delta\lambda(t)$ is required to acquire several frames of interferograms. The non-linearity of this method can be neglected in this case even though (ideally) the phase calculation algorithm requires a constant phase shift.

The simultaneous measurement of multiple reflective surfaces, however, employs phase extraction algorithms that require a much greater wavelength shift $\Delta\lambda(t)$ to acquire the necessary intensity information. These algorithms are also much more sensitive to the phase shift errors. Thus, the phase shift variation in Equation (1) may be large enough to induce a phase calculation error that is no longer negligible. For example, a setup for the measurement of a transparent parallel plate is as follows: $\lambda$=632.8 nm, OPD L=20 mm, total number of interferograms n=45, and a maximum wavelength shift of 1 nm.

Non-linear phase shift resulting from a linear wavelength change with time is an intrinsic feature of any wavelength shifting interferometer. In addition to non-linear phase shift caused by the wavelength change, there exist other factors which contribute to the overall phase shift response. For example, the wavelength change in some driving mechanisms is achieved by changing the length of a Piezoelectric transducer (PZT). The non-linear length change (or response) of the PZT propagates into the phase shift response directly. These additional error sources from currently available driving mechanisms actually result in much larger phase shift errors than those caused solely by wavelength changes themselves.

It is desirable to provide a system and method to linearize the overall phase shift driving mechanism for the measurement of multiple reflective surfaces which demand only small phase shift changes between intensity frames.

SUMMARY OF THE INVENTION

It is an object of this invention to provide an improved method and apparatus for producing a substantially constant phase shift between any two adjacent intensity frames in a phase shift interferometer.

It is another object of this invention to provide a method for producing a constant phase shift between adjacent intensity frames in a phase shifting interferometer.

It is an additional object of this invention to provide a method for producing a constant phase shift between adjacent intensity frames in the acquisition sequence of a wavelength tuned phase shifting interferometer.

It is a further object of this invention to provide a method for effectively calibrating the input to the phase shift driving mechanism of a wavelength tuned phase shifting interferometer to produce a constant phase shift speed for each interferogram during the acquisition of the interferometer.

In accordance with a preferred embodiment of the invention, a wavelength tuned phase shifting interferometer is provided with a tunable light source. A single reflective surface is placed at the location of a test piece in an interferometer; and a phase shift driving mechanism is coupled to the light source to control the wavelength of light emitted therefrom. A calibration is effected by supplying a known input, or a sequence of physical values such as the voltages, to the phase shift driving mechanism to acquire a set of interferograms from the interferometer. A temporal phase shift speed is determined from the set of interferograms. The temporal phase shift speed then is used to generate a new known input to the phase shift driving mechanism for acquiring another set of interferograms. The process is repeated to generate new known inputs to the phase shift driving mechanism until a final input is reached, which produces substantially constant phase shifts during supplying its physical values successively to the phase shift mechanism. The final input value then is used to increment the phase shift driving mechanism to produce substantially linear phase shifts for use with multiple surface measurements of transparent objects placed at the position of the original single reflective surface.

BRIEF DESCRIPTION OF THE DRAWINGS

FIG. 2 is a plot of non-linear phase shift due to wavelength shifting;

FIG. 3 is a plot of phase shift error between adjacent interferograms; and

DETAILED DESCRIPTION

Reference now should be made to the drawings, which illustrate the implementation of a preferred embodiment of the invention in conjunction with an unequal path length interferometer. It should be noted that the optics which are employed in the implementation of the preferred embodiment of the invention are known; and these optics have been utilized, with varying degrees of success, for surface profiling of single and multiple surface objects in PSI systems.

Figure 1:
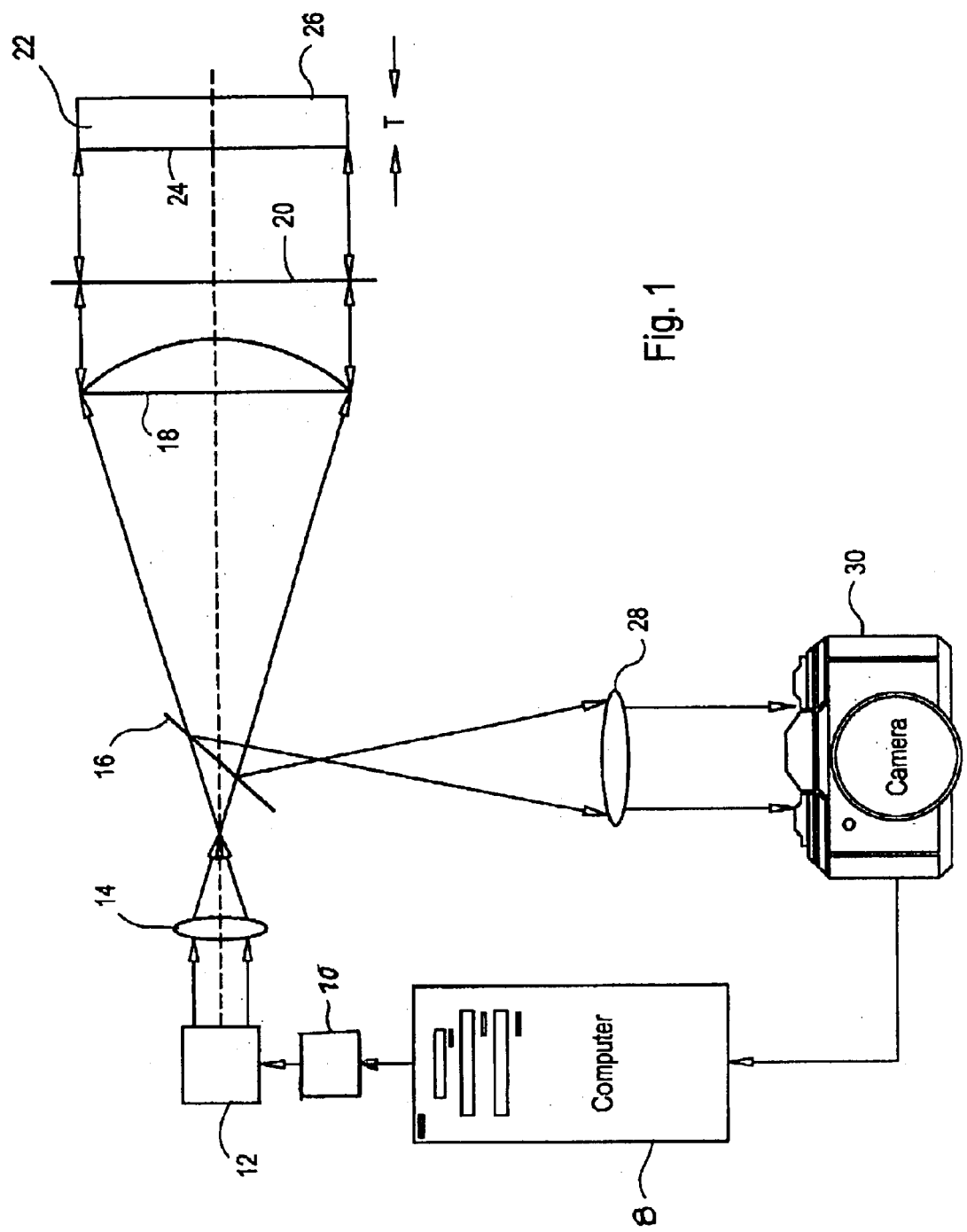
FIG. 1 is a schematic representation of a Fizeau interferometer used in practicing the preferred embodiment of the invention.

The preferred embodiment of the method of the invention is illustrated as used in conjunction with an unequal path length interferometer in the form of the Fizeau interferometer of FIG. 1. It should be noted, however, that other unequal path length interferometers may also be used, such as a Twyman-Green interferometer. Such interferometers simultaneously extract phases of all of the individual interferograms from an set of intensity frames and record superimposed interferograms generated with wave fronts reflected from multiple reflective surfaces. These intensity frames are acquired sequentially by changing the wavelength in the measurement system. The wavelength can be changed mechanically, or, preferably, as illustrated in the system of FIG. 1, with a tunable laser light source.

The method, which is described in greater detail subsequently, takes advantage of the fact that the phase shift which results from the wavelength shift for a given interferogram is proportional to the OPD of that interferogram. In other words, the phases of each of the interferograms in the superimposed interferograms shift at different speeds during acquisition. As noted above, particularly when the surface measurements of the two sides of a transparent object is undertaken, it is desirable that the incremental changes in the wavelength are performed such that the observed phase changes during the acquisition are linear, or as close to linear as possible. Once this has been done, different systems and methods for producing the phase maps or profiles for each of the surfaces of a transparent object having parallel surfaces may be much more accurately obtained.

FIG. 1 is a schematic diagram of a system which typically is used to simultaneously measure and provide a phase profile of both the front 24 and the back 26 surfaces of a transparent measurement object 22. The object 22 may be a glass plate or a thin semiconductor wafer (on the order of 1 micron thick), or any other suitable object.

As shown in FIG. 1, the interferometric system which is employed is a Fizeau interferometer controlled by a computer 8 to provide a voltage controlled signal to a conventional phase shift driving mechanism 10, which in turn operates to control the wavelength of a tunable laser light source 12. The beam of light from the laser light source 12 is supplied through a focusing lens to a beam splitter 16, from which the light passes through a collimating lens 18 to supply coherent light to a reflective reference surface 20 and to the measurement object 22.

It should be noted that only a single surface is shown for the reference surface 20. This surface, however, may be part of a reference flat, the other surface of which may be coated with a non-reflective coating, or the other surface may be tilted with respect to the reflective surface 20; so that reflections from this other surface do not take part in any subsequent measurements. The manner in which this is accomplished to provide a single reference surface 20 is well known, and is not further described here.

The reflected light beams are directed by the beam splitter 16 to an imaging lens 28, which supplies, simultaneously, multiple interferograms to a CCD camera 30 or other suitable recording plane. The camera 30 additionally may include a frame grabber for storing images detected by the camera; or the computer 8 may be configured to provide this function. In any event, the images obtained by the camera 30 are supplied to the computer 8 for processing to produce the desired profiles in a suitable form for immediate display or storage for subsequent utilization.

As noted previously in the background portion above, the relationship between the phase shift and the wavelength shift is not linear. This is clearly shown by the following equation:

$$\theta(t) = \frac{2\pi L(x, y) \Delta \lambda(t)}{\lambda(\lambda - \Delta \lambda(t))}. \quad (1)$$

As noted previously, this equation shows that the phase shift between any two adjacent intensity frames is not a constant if the wavelength change is directly proportional to time. For utilization of the system such as shown in FIG. 1 for measurement or profiling multiple parallel reflective surfaces, however, it is important to modify the wavelength shift to produce, as nearly as possible, a constant phase shift between adjacent frames. The phase shift variation of above equation (1) may be large enough to produce phase calculation errors that are no longer negligible for the measurement of multiple reflective surfaces.

The typical phase shift $\theta$, after removing the linear ramp is depicted in FIG. 2, which clearly illustrates the non-linear phase shift which results from uniform wavelength shifting by the computer 8. Similarly, the phase shift error for every $\Pi/2$ shifting step is shown in FIG. 3; so that as the number of frames increases, the phase shift error also significantly increases. Since the acquisition of the necessary interferograms for measurement of reflective surfaces requires a relatively large number of interferograms (typically, on the order of 45 or more), it can be seen that the phase shift error of FIG. 3 tends to be significant.

Figure 4:
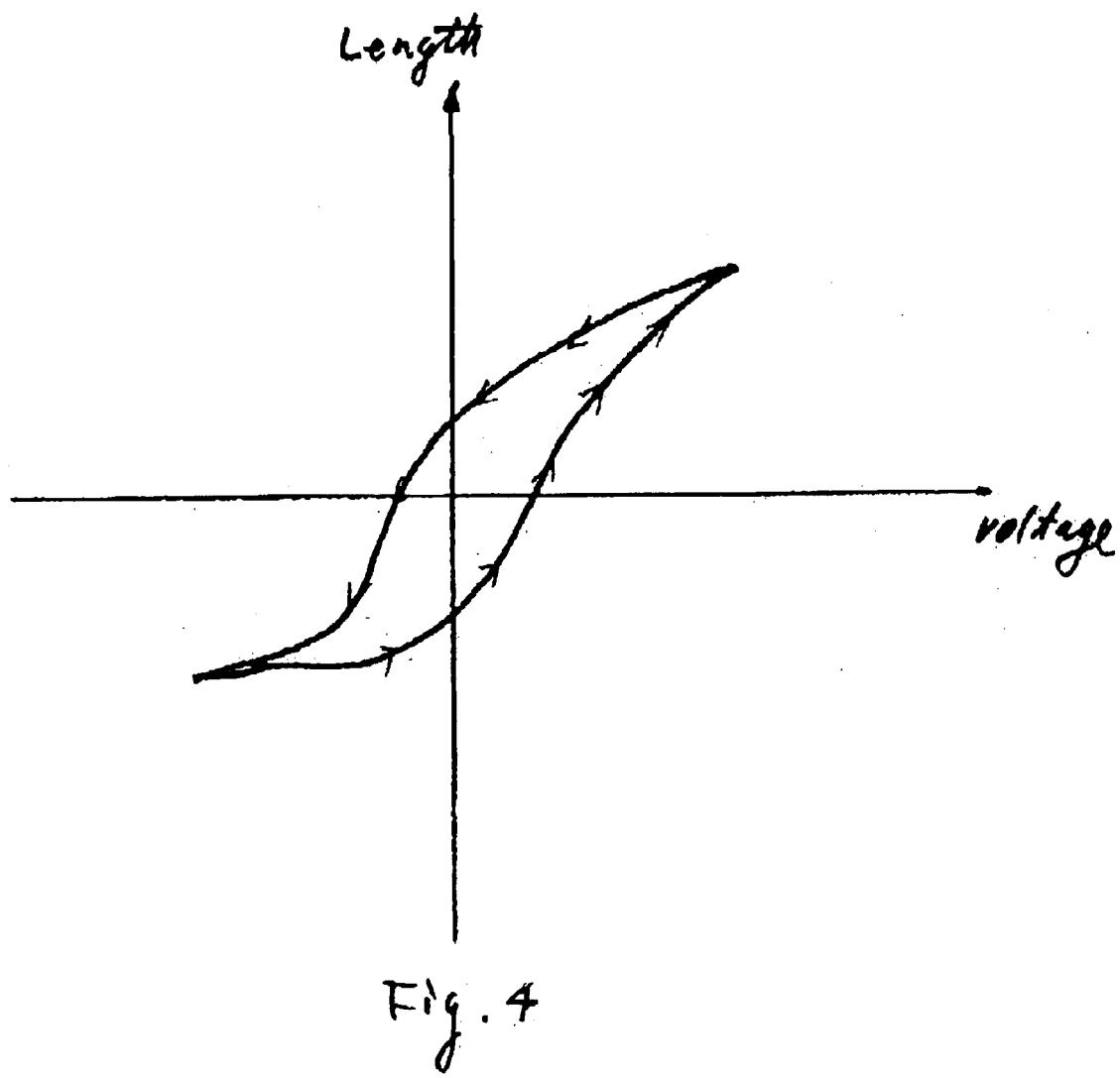
FIG. 4 is a plot of a hysteresis curve of a typical piezoelectric transducer.

As a consequence of the non-linearity which is diagrammed in FIGS. 2 and 3, the method of the preferred embodiment is designed to linearize the overall phase shift driving mechanism as much as possible; so that measurement of multiple reflective surfaces can be undertaken accurately. In addition to the non-linear phase shift caused by the wavelength change, other factors exist which contribute to the overall phase shift response. These other factors are not illustrated in FIGS. 2 and 3; but they compound the phase shift errors which are indicated by these figures. For example the wavelength changes in certain driving mechanisms which may be employed for the driving mechanism 10 of FIG. 1 often are achieved by changing the length of a piezoelectric transducer (PZT). A typical plot of the length of change of PZT with respect to applied voltage is depicted in FIG. 4. It is readily apparent that the non-linear length change (or response) of the PZT propagates into the phase shift response directly. These additional error sources from currently available driving mechanisms actually result in much larger phase shift errors than that caused by the wavelength change itself.

Basically, the method which is described in greater detail subsequently is directed to the conversion of an non-linear phase shift driving mechanism to a linear one for the measurement of an object with multiple reflective surfaces. The method is able to produce an accurate repeatable uniform phase shift speed from a non-linear phase shift driving mechanism, without any additional hardware being required in the system. The interferometric system, in the form of the Fizeau interferometer of FIG. 1, does not need to be modified to incorporate the method of the preferred embodiment of this invention, which allows the standard Fizeau interferometer configuration to produce significantly improved results in the measurement of multiple parallel surfaces.

To accomplish the desired results, the method of this invention obtains the non-linear phase shift information directly from the final results of acquisition, i.e. from the acquisition interferograms which are produced at each shift of phase in the operation of the system. As a consequence, all of the error sources which produce a non-linear phase shift are taken into account, irrespective of the nature or location of the sources. The error sources may include the non-linear response of phase shift to linear wavelength changes, the non-linear property of PZT to the voltage change, and more. In other words, the method of the preferred embodiment of this invention removes all non-linear phase shift errors from error sources, no matter how or where these error sources occur.

In accordance with the preferred embodiment of the invention, a method is employed to generate a non-linear input from the computer 8 to the phase shift driving mechanism 10 for the laser light source 12, to cause the output of the light source 12 to produce a linear phase shift or a constant phase shift speed for any given interferometric signal during the acquisition of each of the interferograms at the acquisition plane 30. It has been found that properties of the non-linear phase shift driving mechanism do not change from time to time under a controlled environment. This means that once all of the parameters of the system have been established, the non-linearity of the phase shift which is produced by that system (from whatever causes this non-linearity is based) is constant or not changing. Consequently, the non-linear phase shift driving voltage which needs to be applied by the computer 8 to the phase shift driving mechanism 10 can be calibrated. Although the characteristics of any given phase shift driving system 10 cannot be changed without additional hardware, the method which is employed herein is able to generate an input from the computer 8 to the phase shift driving mechanism 10 to counteract the non-linear characteristics of the phase shift mechanism of the entire interferometer, such as the Fizeau interferometer shown in FIG. 1.

The non-linear input is obtained from a calibration process which senses the response from a single reflective surface. This is done initially to calibrate the system; and once the input is available (that is, once the calibration has been performed), it can be used repeatedly to acquire data for the measurement of multiple reflective surfaces, such as the surfaces 24 and 26 shown for the transparent object 22 in FIG. 1.

The method of the preferred embodiment of this invention causes a non-linear phase shift driving mechanism to produce a constant phase shift for data acquisition without requiring knowledge as to the non-linear characteristics of the system phase shift parameters. As stated previously, it does not matter where the non-linear characteristics are introduced in the system at any point, but only that these non-linear characteristics exist and that they can be determined.

To provide the desired compensation, a phase shift driving mechanism, such as the mechanism 10, is supplied with a known input from the computer 8 during data acquisition. The data corresponding to this input is a set of interferograms at the image plane, as depicted by the CCD camera 30 in FIG. 1. To determine the phase shift speed of any given interferogram, only those interferograms taken immediately before and immediately after a given interferogram are compared with the given interferogram. This produces temporal information of the phase shift speed, or of the non-linear characteristics of the phase shifts for the set of interferograms. The temporal phase shift information then is used to generate a new known input. The new input to the phase shift driving mechanism then generates another set of interferograms. The process is repeated until the phase shift speed during acquisition of each subsequent interferogram is constant enough to meet the requirement demanded in the given application, such as the measurement of the multiple reflective surfaces 24 and 26.

Generally, the process converges rapidly, typically within two to five times, or two to five measurements, to an input with which the phase shift driving mechanism 10 can output a phase shift speed that is nearly constant. Sometimes, only one time is sufficient. Once a mechanism is calibrated, the input from the computer 8 can be used for the measurement of multiple reflective surfaces. Every set of interferograms acquired with this input has a phase shift speed that is as linear as the calibrated one. Once the calibration is complete, the single reflective surface used for calibration, which was placed at the position of the surface 24 is removed; and the object 22 is placed as shown in FIG. 1 with the closest surface 24 in the same plane as the calibration surface.

The method which is described in the following greater detail allows an interferometer to acquire a set of intensity frames at the recording plane 30, with every individual interferogram having a highly uniform phase shift speed. The uniform phase shift speed is necessary for an interferometer to accurately measure an object with multiple reflective surfaces, such as the surfaces 24 and 26. Uncompensated measurements are greatly deteriorated with respect to measurements performed on a single surface. The method described herein also can be used for measurement of an object with a single reflective surface if highly precise measurement results are demanded, or if the phase shift driving mechanism is very non-linear.

In practicing the method of producing the desired non-linear phase shift calibration, a single reflective surface is first placed at the position of the surface 24 shown in FIG.

1. The operation of the interferometer then is conducted in a conventional fashion for a Fizeau interferometer. A set of interferograms is acquired with a known input $V_m(t)$ to the phase shift driving mechanism 10. The known input $V_m(t)$ is generated by the computer 8 according to the interferometer hardware information. For example, if the wavelength of the laser λ in a measuring system is known, along with the cavity length L, and the wavelength change per voltage S, we can find:

$$v_m(t) = kt \qquad (2)$$

where t is t-th frame of the interferograms and:

$$k = \frac{\lambda^2}{8SL}. \qquad (3)$$

If the hardware information about the phase shift driving mechanism is not known, simply start k with a small value. A mean phase shift from the set of interferograms acquired with the input $V_m(t)$ can be determined in the frequency domain by means of Fourier transform. Assume the set of interferograms can be expressed as x(t), then the Fourier transform is:

$$X(\omega) = \sum_t x(t)e^{-j\omega t} \qquad (4)$$

and its energy density spectrum is:

$$S(\omega) = |X(\omega)|^2 \qquad (5)$$

This is the distribution of phase-shifting energy in the frequency domain. The mean phase shift is equal fo the angular frequency $w_m$ where the maximum of S(w), 0<w<Π, occurs. Now modify k in Equation (2) by:

$$k_{new} = k_{old} \frac{\Theta}{\omega_m} \qquad (6)$$

where Θ is the desired phase shift between adjacent interferograms. Θ=Π/2 in most applications. The above process is repeated until |Θ−$w_m$|<Π/180.

After $V_m(t)$ has been obtained from the above linear phase shift calibration, the non-linear phase shift calibration can be started. A phase shift $\Theta_m(t)$ is achieved from a set of interferograms acquired by the input $V_m(t)$. For example, for a given pixel location (x,y), the phase shift Θ at the pixel for k-th frame of the interferograms can be calculated by:

$$\theta_k(x, y) = \cos^{-1} \frac{I_{k+2}(x, y) - I_{k-2}(x, y)}{2(I_{k+1}(x, y) - I_{k-1}(x, y))}, \qquad (7)$$

where $I_k(x,y)$ is the intensity value at the pixel position (x,y) in k-th interferogram. The mean phase shift $\theta_m(k)$ for k-th frame interferogram is the mean of phase shifts calculated only at pixels where $I_{k+1}(x,y)-I_{k-1}(x,y)$> mean of all $I_{k+1}(x,y)-I_{k-1}(x,y)$. If the set of interferograms acquired from an interferometer is noisy, the phase shift $\theta_m(t)$ calculated from it may need an additional processing to smooth the results, such as using a least-square fitting technique to approximate $\theta_m(t)$ with a polynomial:

$$P_n(t) = \sum_{k=0}^{n} a_k t^k, \qquad (8)$$

where n≥2. After $\theta_m(t)$ achieved with input $v_m(t)$, a new known non-linear input can be obtained by:

$$v(t) = \frac{\Theta t v_m(t)}{\theta_m(t)}. \qquad (9)$$

The above non-linear phase shift calibration process is repeated using the calculated v(t) as new $v_m(t)$ until the linearity of phase shift $\theta_m(t)$ is satisfied.

Once the phase shift calibration is done, the non-linear input v(t) can be used for the measurement of an object with one or more reflective surfaces. This may be done, for example, by using the Fizeau interferometer shown in FIG. 1. For example, with the method described above, the interferometer of FIG. 1 may be used to measure a mask substrate for advanced semiconductor microlithography. The measurement of such substrates in a Fizeau interferometer, as shown in FIG. 1, has been effected for substrates of 2 mm thickness, and with two reflective surfaces, such as the surfaces 24 and 26. The rms repeatability of the measurement of each of the surfaces is <0.01 nm; and a fringe print-through error less than 0.1 nm has been achieved with an acquisition of forty-five intensity frames. Without utilizing the method described above for correcting for the non-linearity of the system, fringe print-through error greater than 3 nm occurs and can be easily identified. It should be noted that the fringe print-through error results from a mixing of the phase information among the various reflective surfaces. The method which is described above and which is used in conjunction with an unequal path length interferometer, such as the Fizeau interferometer of FIG. 1, significantly improves the ability of phase extracting algorithms to separate interferograms from a set of phase-shifted superimposed interferograms. The method which is described herein improves the operating characteristics of any known phase extracting algorithm.

The non linear phase shift calibration can also be done with the derivatives of $v_m(t)$ and $\theta_m(t)$. A set of interferograms is acquired with a known $v_m(t)$ whose derivative $v'_m(t)$ may be expressed as:

$$v'_m(t) = k = \frac{\lambda^2}{8SL}. \qquad (10)$$

A derivative of the phase shift speed $\theta'_m(t)$ is determined from the set of interferograms. Similar to Equation (9), a new derivative of non linear input can be expressed as:

$$v'(t) = \frac{\Theta v'_m(t)}{\theta_m(t)} \qquad (11)$$

Thus, the new non linear input becomes:

$$v(t) = \int \frac{\Theta v'_m(t)}{\theta_m(t)} dt + v_0, \qquad (12)$$

where $v_0$ is a constant.

The foregoing description of a preferred embodiment of the invention is to be considered illustrative and not as limiting. Various changes will occur to those skilled in the art for performing substantially the same function, in substantially the same way, to achieve substantially the same result without departing from the true scope of the invention as defined in the appended claims.

What is claimed is:

1. In a wavelength-tuned phase shifting interferometer, a method for producing a constant phase shift speed for data acquisition including the steps of:

providing a tunable coherent light source in an interferometer;

placing a single reflective surface at the location of a test piece in the interferometer;

coupling a phase shift driving mechanism to the light source to control the wavelength of light emitted therefrom;

supplying a known input to the phase shift driving mechanism to acquire a set of interferograms from the interferometer;

determining a temporal phase shift speed from the set of interferograms;

generating a new known input to the phase shift driving mechanism for acquiring another set of interferograms with the temporal phase shift speed, the known input, and the desired phase shift between adjacent interferograms; and using the input which produced the predetermined desired phase shift obtained from a single reflective surface as a final input for application to the phase shift driving mechanism to produce substantially linear phase shifts of the interferograms produced by the interferometer.

2. The method according to claim 1 further including the step of using the final input value to increment the phase shift driving mechanism for phase mapping parallel surfaces of a transparent object.

3. The method according to claim 2 wherein the final input is a non-linear input expressed by:

$$v(t) = \frac{\Theta t v_m(t)}{\theta_m(t)},$$

or $$v(t) = \int \frac{\Theta v'_m(t)}{\theta'_m(t)} dt + v_0,$$

or $$v(t) = \sum_{n=0}^{N} K_n t^n \text{ for } N > 1,$$

or $$v(t) = \sum_{n=0}^{N} b_n t^n \text{ for } N \geq 1 \text{ in any region } t \in (t_m, t_{m+1}), m = 0, 1, 2, \ldots;$$

or any other non-linear form;

Where $\Theta$ is the desired phase shift between adjacent interferograms and $\theta_m(t)$ is the actual phase shift which is achieved from a set of interferograms acquired by an input $v_m(t)$; $V'_m(t)$ and $\theta'_m(t)$ are the derivatives of $v_m(t)$ and $\theta_m(t)$ respectively, and $K_n, b_n, N, t_m,$ and $t_{m+1}$ are constants.

4. The method according to claim 1 wherein the new knowninput is a non-linear input expressed by;

$$v(t) = \frac{\Theta t v_m(t)}{\theta_m(t)},$$

$$v(t) = \int \frac{\Theta v'_m(t)}{\theta'_m(t)} dt + v_0,$$

or $$v(t) = \sum_{n=0}^{N} K_n t^n \text{ for } N > 1,$$

or $$v(t) = \sum_{n=0}^{N} b_n t^n \text{ for } N \geq 1 \text{ in any region } t \in (t_m, t_{m+1}), m = 0, 1, 2, \ldots;$$

or any other non-linear form;

Where $\Theta$ is the desired phase shift between adjacent interferograms and $\theta_m(t)$ is the actual phase shift which is achieved from a set of interferograms acquired by an input $v_m(t)$; $V'_m(t)$ and $\theta'_m(t)$ are the derivatives of $v_m(t)$ and $\theta_m(t)$ respectively, and $K_n, b_n, N, t_m,$ and $t_{m+1}$ are constants.

5. The method according to claim 4 wherein the new known non-linear input v(t) is a voltage function, current function, temperature function, or any other function of variable t where t is time, or a function of time.

6. The method according to claim 1 wherein the known input is a linear input or a non-linear input.

7. The method according to claim 1 wherein the step of generating a new known input is performed only when the temporal phase shift does not satisfy a predetermined desired phase shift and its non-linear tolerance.

* * * * *